United States Patent [19]
Skoyles

[11] 3,893,693
[45] July 8, 1975

[54] ANTI-LOCK CONTROL VALVE INCLUDING A DISPLACEABLE FLOW-MEASURING PISTON

[75] Inventor: Derek Robert Skoyles, Salfords, England

[73] Assignee: U.S. Philips Corporation, New York, N.Y.

[22] Filed: Sept. 10, 1973

[21] Appl. No.: 395,911

[30] Foreign Application Priority Data
Aug. 29, 1973 United Kingdom............ 43227/73

[52] U.S. Cl. ............................. 303/21 F; 303/68
[51] Int. Cl. ........................................... B60t 8/06
[58] Field of Search............... 303/21 F, 61–63, 303/68–69, 10; 188/181 A

[56] References Cited
UNITED STATES PATENTS

| | | |
|---|---|---|
| 3,661,427 | 5/1972 | Hodge ............................. 303/21 F |
| 3,708,213 | 1/1973 | Skoyles............................. 303/21 F |
| 3,752,537 | 8/1973 | Ochiai .............................. 303/21 F |
| 3,782,786 | 1/1974 | Matsumura....................... 303/21 F |
| 3,801,161 | 4/1974 | Sharp ............................... 303/21 F |

*Primary Examiner*—Duane A. Reger
*Assistant Examiner*—D. C. Butler
*Attorney, Agent, or Firm*—Frank R. Trifari

[57] ABSTRACT

A fluid flow control arrangement defines a fluid path, including a flow control orifice, for the flow of fluid between inlet and outlet ports of the arrangement. The arrangement includes a displaceable flow-measuring piston across which a fluid pressure difference can be established due to the restriction by the flow control orifice to such flow of fluid in the fluid path, the fluid pressure difference providing a force tending to displace the flow-measuring piston into sealing engagement with the outlet port.

5 Claims, 1 Drawing Figure

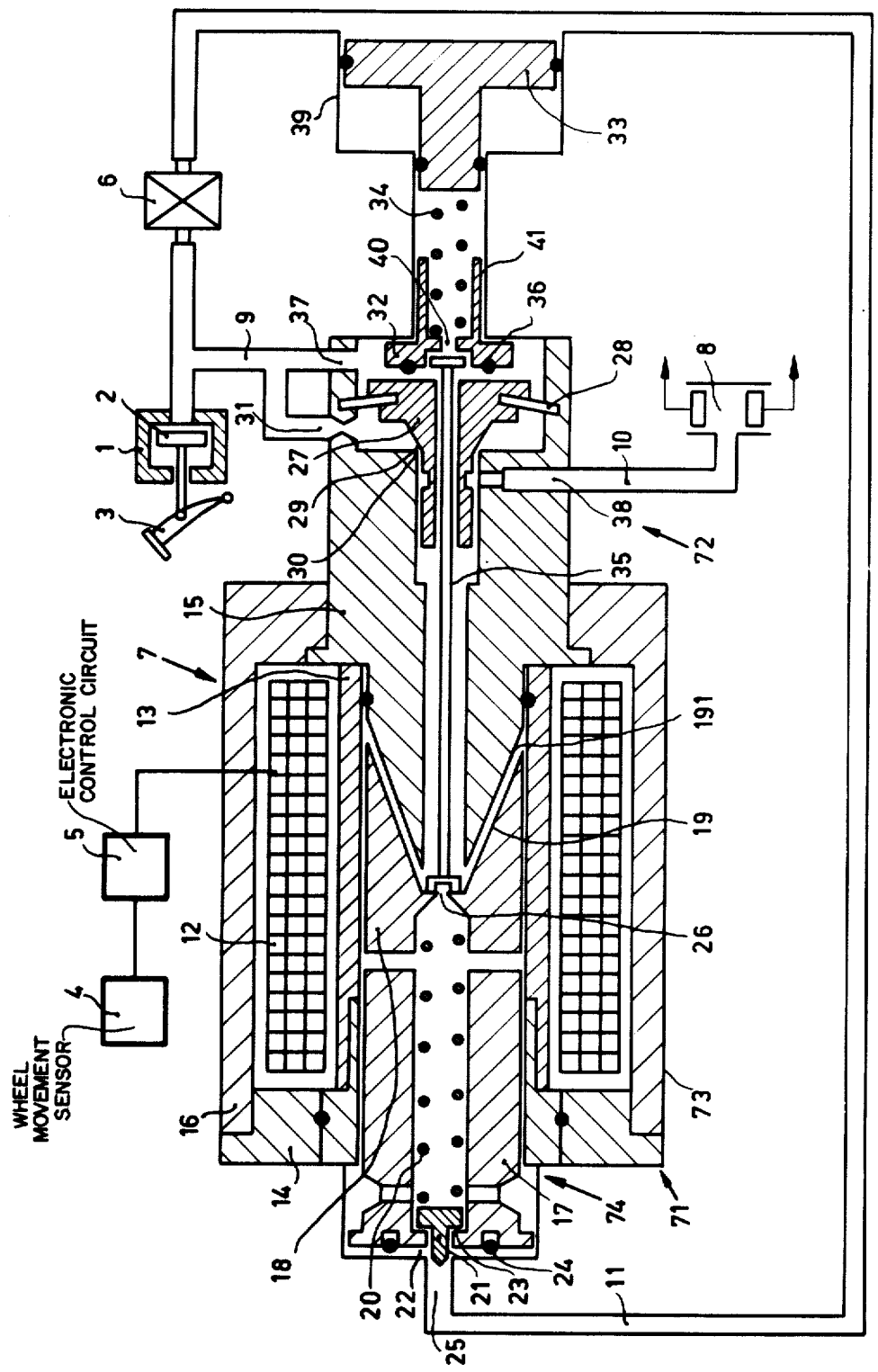

ANTI-LOCK CONTROL VALVE INCLUDING A DISPLACEABLE FLOW-MEASURING PISTON

This invention relates to anti-lock brake systems for wheeled vehicles, that is, brake systems including means for improving braking performance of a vehicle by causing a decrease of the braking force applied to a road wheel of the vehicle if the wheel tends to lock, in a circumstance likely to produce an incipient skid condition, following brake application, said means then causing the braking force to be increased again without the need for any change in the actual braking action (by a person using the brake) causing the brake application. Such brake systems can be successful in reducing the risk of skidding due to wheel lock and in maintaining directional control during braking, and can also reduce braking distances.

The invention relates more particularly to a fluid-pressure operated anti-lock vehicle brake system of the character comprising, for use in conjunction with a vehicle wheel and associated wheel brake, a fluid pressure source which in response to a braking action provides fluid under pressure via a fluid pressure connection to the brake, said fluid under pressure being effective to produce braking pressure at the brake to cause the latter to apply a braking force at said wheel, an anti-lock control valve which is suitably a solenoid valve mechanism, wheel movement sensing means for producing an output function for causing actuation of the anti-lock control valve when a particular criterion which is related to wheel rotational movement and signifies that wheel locking is imminent, and a relief connection interconnected with said fluid pressure connection or with the brake and adapted to be opened by said anti-lock control valve, when the latter is actuated, to allow displacement of fluid from said fluid pressure connection or from the brake into said relief connection whereby to cause a reduction in braking pressure and thus a decrease of the applied braking force. A preferred criterion for causing actuation of the anti-lock control valve is when wheel slip exceeds a chosen value.

An anti-lock vehicle brake system of the above character may be either of the master cylinder type in which fluid in a master cylinder is pressurised by a piston, when a braking action takes place, to pressurise fluid in said fluid pressure connection, or of the continuously pumped type in which fluid under pressure is available continuously in the brake system and is "modulated" by a braking action such that the pressurised fluid is introduced into said fluid pressure connection to an extent determined by the extent of modulation. Also, the braking action causing operation of the master cylinder or of the brake modulator, as the case may be, may be with or without servo or amplifier assistance. Having regard to the above, the term "fluid pressure source" as used in this specification is to be construed accordingly.

The wheel movement sensing means can comprise a mechanical inertia sensor or the combination of a transducer for producing an electrical pulse train which is a function of wheel speed and an electronic control circuit for processing said electrical pulse train.

A separate system of the above character (with a common fluid pressure source) can be provided in respect of each road wheel of a vehicle, but it would also be possible to provide a single system for the two (rear) wheels driven by a vehicle transmission shaft with sensing means associated with the shaft for producing said output function. As another alternative, a single system may be provided in common for all the road wheels of a vehicle. In this case, each road wheel would have its own wheel movement sensing means and any of the latter would provide said output function to cause actuation of the anti-lock control valve when the appertaining wheel tended towards a locked condition.

In co-pending U.S. application Ser. No. 365,220 which claims the priority of U.K. Pat. application No. 28584/72, there is described a fluid flow control arrangement which comprises a fluid path, including a flow control orifice, for the flow of fluid between inlet and outlet ports of the arrangement, a displaceable flow-measuring piston across which a fluid pressure difference can be established due to the restriction by said flow control orifice to such flow of fluid in the fluid path, said fluid pressure difference providing a force tending to displace said flow-measuring piston into sealing engagement with said outlet port, a fluid pressure equalizing path for applying fluid pressure at said outlet port to an equalizing area at the side of said flow-measuring piston remote from said outlet port which equalizing area is isolated from said fluid pressure at said inlet port, and spring means providing a force tending to displace said flow-measuring piston away from said outlet port in opposition to the force due to said fluid pressure difference, whereby the flow rate of fluid into said outlet port is a function of the force of said spring means and the cross-sectional area of the flow control orifice, the arrangement further comprising means for varying the force of said spring means so as to vary the flow rate of fluid at said outlet port.

In a preferred embodiment of the fluid flow control arrangement, the fluid pressure equalizing path is provided as an orifice extending through the flow-measuring piston and there is provided a sealing and balancing member which is located at the side of the flow-measuring piston remote from said outlet port and has a seal bounding the orifice at that side, an aperture communicating with said orifice within the seal boundary and an equalizing area of said sealing and balancing member bounding said aperture and replacing the equalizing area of said flow-measuring piston.

This fluid flow control arrangement has a particular but non-exclusive application in an anti-lock vehicle brake system of the character referred to to control the rate at which braking pressure is increased again at the end of an anti-lock action. In this application, such control would be exercized as a function of the volume of fluid displaced through the actuated anti-lock control valve into said relief connection.

In co-pending U.S. application Ser. No. 449,359 filed Mar. 8, 1974 which is a continuation of abandoned U.S. application Ser. No. 263,421 filed June 16, 1972 which relies on the priority of U.K. Pat. application No. 32541/71, there is described a solenoid valve mechanism having a fluid flow path in which there is included means responsive to flow of fluid therein for so controlling the flow rate of such fluid as to maintain it substantially constant, this solenoid valve mechanism comprising an armature which is displaceable by a solenoid force produced on energization of the mechanism to cause a valve to open an orifice in said fluid flow path, and said means comprising a flow-measuring member which is displaceable by a force produced by a fluid pressure difference across it due to said flow of fluid, to displace said armature against said solenoid force so as to tend to cause said valve to close said orifice, the flow rate being thereby held at a substantially constant value at which the force produced by said fluid pressure difference is substantially equal to said solenoid force. Said flow-measuring member may be held out of engagement with said armature when the mechanism is unenergised and be adapted to undergo initial displacement by fluid flow through the mechanism into such engagement at the onset of such fluid flow when the mechanism is energised to open said orifice, whereby to permit an initially high flow rate until said engagement occurs.

This solenoid valve mechanism also has a particular but non-exclusive application in an anti-lock vehicle brake system of the character referred to to control the rate at which braking pressure is reduced during an anti-lock action.

The present invention provides a fluid pressure control device which includes a fluid flow control arrangement that functions as aforesaid and which includes, furthermore, a solenoid valve mechanism that is operatively associated with the fluid flow control arrangement and also functions as aforesaid.

According to the invention such fluid pressure control device comprises:

a fluid flow control arrangement defining a fluid path, including a flow control orifice, for the flow of fluid between inlet and outlet ports of the arrangement;

a displaceable flow-measuring piston across which a fluid pressure difference can be established due to the restriction by said flow control orifice to such flow of fluid in the fluid path, said fluid pressure difference providing a force tending to displace said flow-measuring piston into sealing engagement with said outlet port;

an orifice extending through the flow-measuring piston;

a sealing and balancing member which is located at the side of the flow-measuring piston remote from said outlet port and has a seal bounding the orifice at that side, an aperture in said member communicating with said orifice within the seal boundary, whereby to provide a fluid pressure equalizing path for applying fluid pressure at said outlet port to an equalizing area of said sealing and balancing member bounding said aperture, which equalizing area is isolated from fluid pressure at said inlet port;

a solenoid valve mechanism defining a fluid flow path through the device between said outlet port and a relief port;

an armature of said mechanism, which armature is displaceable by a solenoid force produced on energization of the mechanism to cause a valve to open said relief port against the force of a solenoid spring;

a flow-measuring member of said mechanism, which member is displaceable against the force of said solenoid spring by a force produced by a fluid pressure difference across it due to flow of fluid into said relief port, to displace said armature against said solenoid force so as to tend to cause said valve to close said relief port, the flow rate into said relief port being thereby held at a substantially constant value at which the force produced by said fluid pressure difference is substantially equal to said solenoid force; and means mechanically engaging said flow-measuring member with said sealing and balancing member so that the solenoid spring acts effectively when the solenoid is unenergized to urge said flow-measuring piston away from said outlet port in opposition to the force due to the fluid pressure difference across said flow-measuring piston, whereby the flow rate of fluid into said outlet port is a function of the force of said solenoid spring and the cross-sectional area of said flow control orifice, until the difference between the fluid pressures at said inlet and said outlet ports is sufficiently low for the solenoid spring, acting through said means, to separate said sealing and balancing member from said flow-measuring piston, whereafter to permit flow of fluid between said inlet and outlet ports via said orifice through the flow-measuring piston.

The nature of the invention may be better understood from the following description, which is given by way of example with reference to the single FIGURE of the accompanying drawing, of an anti-lock vehicle brake system of the character referred to which embodies a fluid pressure control device conforming to the invention.

Referring to the drawing, the anti-lock vehicle brake system there shown is a master cylinder type hydraulic system comprising a master cylinder 1 having a piston 2 which is actuable by a brake pedal 3. The system further comprises a wheel movement sensor 4, an electronic control circuit 5, a scavenging pump 6 and a fluid pressure control device 7 which incorporates a solenoid valve mechanism and a fluid flow control arrangement. A wheel brake 8, for a vehicle road wheel (not shown), is controlled by the system.

In operation of the system for normal brake application, fluid in pressure lines 9 and 10 is pressurized by the master cylinder 2 to an extent determined by a driver's braking action and this produces a corresponding braking pressure in the brake 8. At this time, the device 7 allows free passage of fluid between the pressure lines 9 and 10. If the driver's braking action causes the road wheel with which the brake 8 is associated to exceed a wheel slip of chosen value, this is detected by the wheel movement sensor 4 and the control circuit 5 and the latter energises the solenoid valve mechanism. Details of the manner of operation and composition of the elements 4 and 5 are not thought to be necessary for an understanding of the present invention, but an example is given in co-pending U.S. application Ser. No. 272,776 which claims the priority of U.K. Pat. applications Nos. 35321/71 and U.S. application Ser. No. 368,953 which claims the priority of U.K. Patent Application 28587/72 filed June 19, 1972. Another form of control circuit is described in U.S. Pat. No. 3,710,186 which claims the priority of U.K. Pat. No. 1,248,788.

As a result of the energization of the solenoid valve mechanism (the operation of which will be considered in detail presently) a fluid path is opened through the device 7 to relief connection 11 so that fluid under pressure at the brake 8 is displaced through the device 7 to the connection 11, thereby reducing braking pressure. For normal anti-lock operation the solenoid valve mechanism remains energized for only the short time required to allow the braking pressure to fall sufficiently low for the wheel associated with the brake 8 to recover towards free rolling speed. When the solenoid valve mechanism is de-energized, braking pressure can build up again to restore braking. This anti-lock operation of the system is repeated each time the road wheel which it is controlling tends towards a locked condition.

The braking performance achieved by an anti-lock vehicle brake system can be improved if some control is exercized both on the rate at which braking pressure is reduced following actuation of the solenoid valve mechanism, and on the rate at which braking pressure is increased again when the solenoid valve mechanism is de-energized at the end of an anti-lock brake action. The need for such controls stems from the different road surface conditions for which the system is to afford optimum performance. For instance, for a road surface offering a high co-efficient of friction ($\mu$) between itself and a road wheel, braking pressure would not need to be reduced to the same extent as for a road surface offering low ($\mu$) because the wheel would recover towards free rolling speed more quickly in the first case than in the second case. Thus, if a system is arranged to displace fluid to reduce braking pressure at a very high rate, braking pressure could be reduced to a lower value than is necessary for the wheel to recover on a high ($\mu$) surface, due to inertia in the mechanics of the system and time delays in solenoid response following de-energization of the solenoid valve mechanism. On the other hand, if the rate at which braking pressure is reduced is made lower (i.e. compatible with a high $\mu$ surface), then it may take too long to free the braked wheel on a low ($\mu$) surface. Therefore a compromise is necessary and a selected rate of braking pressure reduction chosen. The solenoid valve mechanism in the fluid pressure control device 7 provides the controlled rate of braking pressure reduction. This mechanism furthermore allows an initial braking pressure reduction at a very high rate before stabilizing at the selected (lower) rate. With regard to the increase of braking pressure at the end of an anti-lock action, the optimum rate here is also dependent on the road surface ($\mu$). For instance, for a high ($\mu$) surface, for which under the control of the solenoid valve mechanism, braking pressure has not fallen very far, a high rate of braking pressure increase is desirable; whereas for a low ($\mu$) surface for which again under the control of the solenoid valve mechanism, braking pressure has fallen to a lower value, a lower rate of braking pressure increase is desirable. The fluid flow control arrangement of the device 7 exercises this control on braking pressure increase.

Consider now the device 7 in detail. The solenoid valve mechanism thereof comprises an energizing coil 12 of hollow cylindrical shape which is mounted on a brass sleeve 13 which bounds a magnetic structure represented generally only by the parts 14, 15 and 16. An armature of the mechanism comprises two hollow cylindrical parts 17 and 18 located end-to-end in the hollow interior of the magnetic structure. The part 18 is coned and abuts a complementary coned shoulder 19 on the magnetic part 16 and with the solenoid valve mechanism unenergised, is held in this position by armature spring 20 which acts at its other end on a valve seal 21. The valve seal 21 and the armature part 17 have co-operating shoulder portions 22 and 23 by which this part is urged by the armature spring 20 away from the part 18. The end face of the armature part 17 carries an O-ring seal 24 which provides a fail-safe feature of the solenoid valve mechanism as described in co-pending U.S. application Serial No. 366,307 filed June 1, 1973 which claims the priority of U.K. Pat. application No. 28586/72.

When the solenoid valve mechanism is energized, the parts 17 and 18 are drawn into engagement by the solenoid magnetic force against the force of the armature spring 20, so that the valve seal 21 is withdrawn from the solenoid outlet port 25. As a result, fluid in line 10 to the brake 8 is displaced through the hollow interior of the armature parts 17 and 18 to the outlet port 25. The initial surge of this fluid carries the armature part 18 to the left (as seen in the drawing) so that an initial high dumping of fluid through the outlet port 25 results. Once the parts 17 and 18 are in engagement fluid flow through a small edge orifice 26 in the part 18 produces across this orifice a fluid flow force, due to the product of the pressure drop across the orifice and the cross-sectional area of part 18, which tends to urge part 18 and thus the part 17 to the left against the solenoid magnetic force across the coned portion of part 18 and the complementary coned shoulder 19, whereby to tend to cause valve seal 21 to reseal the outlet port 25. This reduces the flow of fluid through this outlet port 25 and thus through the hollow interior of the armature parts 17 and 18 with the result that the pressure drop across orifice 26 is lessened so that the solenoid magnetic force tends to overcome the fluid flow force and thereby tends to displace the valve seal 21 away from the outlet port 25. In this way a state of equilibrium is reached in which the solenoid magnetic force is balanced by the fluid flow force across orifice 26. This equilibrium gives the selected flow rate through the outlet port 25 and thus controls the rate at which braking pressure is reduced at the brake 8.

The solenoid valve mechanism interacts with the fluid flow control arrangement of the device 7 as follows, during its operation. The fluid flow control arrangement comprises a fluid flow control member 27 which is secured to a flexible diaphragm 28. This member 27 has a conic seal 29 which co-acts with an edge 30 formed in part 15 to provide flow control of fluid through the arrangement between the master cylinder 2 and the brake 8. Fluid from the master cylinder 2 can flow from one side of the member 27 to the other via an edge orifice 31 formed in the part 15. There is associated with the member 27 a flap valve 32 and a reservoir piston 33 and associated spring 34 which function, as will be described, to control the rate of fluid flow in this path through the arrangement.

When the solenoid valve mechanism is unenergized, part 18 in its limit position engages with a shaft 35 which extends with clearance through the member 27 and which displaces the valve 32 away from the member 27 such that an O-ring seal 36 on the valve 32 is broken. This displacement is against any force of spring 34. In this position of the valve 32 there is a free passage for fluid flow in another path through the arrangement between the master cylinder 2 and the brake 8, this flow being from inlet port 37 through the clearance between member 27 and shaft 35 to outlet port 38. However, as soon as the solenoid valve mechanism is energized and fluid flow causes movement of the armature (17, 18) to the left, shaft 35 is no longer held by armature part 18 so that the valve 32 is urged by spring 34 into engagement with member 27 to close the O-ring seal 36. (This will happen when fluid enters a reservoir 39 if there is no initial compression of spring 34).

As a result, fluid flow between the master cylinder 2 and the brake 8 can now only be via the edge orifice 31 and the flow control gap 29, 30. During solenoid energization this gap is closed, so that the master cylinder 2 is cut off from the brake 8, due to the force of spring 34 which acts via the valve 32 on the member 27, the force of this spring 34 being increased as fluid is displaced through the opened solenoid valve mechanism and via relief connection 11 into the reservoir 39 to displace the reservoir piston 33 as a function of the volume of this fluid. When the solenoid valve mechanism is subsequently de-energized, the shaft 35 attempts to disengage the valve 32 from the member 27 by the force of spring 20, but the fluid pressure difference across O-ring 36 maintains the valve 32 clamped to the member 27, and the overall effect is that member 27 and valve 32 are displaced to the right (as seen in the drawing) clamped together, thereby opening the flow control orifice 29, 30. There is now fluid flow from the master cylinder 2 to the brake 8 to provide a build-up of braking pressure via this flow control orifice. The pressure difference across the member 27 due to flow of fluid through the edge orifice 31 tends to close the flow control orifice 29, 30, and the shaft 35, through the force of the armature spring 20 minus the opposing force of spring 34, tends to maintain this flow control orifice open. Therefore, a state of equilibrium is reached in which these forces are balanced to give a selected fluid flow rate. In order that the fluid pressure at the outlet port 38 does not affect this state of equilibrium, an orifice 40 is provided in the valve 32 so that this fluid pressure is applied to an area equal to that defined by 30 and this area is constituted by piston 41. The actual value of the flow rate is determined by the volume of fluid in reservoir 39 because depending on this volume, piston 33 is compressing spring 34 which acts on the valve 32 to provide the force that opposes the force of armature spring 20. The reservoir 39 is emptied following de-energization of the solenoid valve mechanism by the pump 6 which is returning fluid from the reservoir 39 to the pressure line 10. The pump removes sufficient fluid from the reservoir 39 for the piston 33 to be returned by the fluid pressure through the orifice 40 of the valve 32 to its original position, thereby to increase progressively the rate of braking pressure build up. Once the difference between master cylinder pressure and braking pressure is low enough, and the force of spring 34 has weakened sufficiently, the shaft 35 disengages the valve 32 from the member 27, thereby re-opening the free passage for fluid between the master cylinder 2 and the brake 8. A pump piston (not shown) of the pump 6 can be driven by the road wheel associated with the brake 8 by means of a shallow cam (not shown) that rotates with this wheel.

As a possible modification to the fluid flow control arrangement of the device 7, the armature parts 17 and 18 may be joined together to form a single armature part. This has the advantage of having only one gap, which is conical, instead of two gaps, in the magnetic circuit of the solenoid valve mechanism. With this modification a separate flow-measuring member, having an initial displacement to afford an initial high dumping of fluid through the outlet port 25, would be provided between the single armature part and the fluid flow control arrangement, with the armature spring 20 acting on this separate flow-measuring member. Also, as a modification, the shaft 35 may be integral with the flap valve 32.

As another modification, the piston 41 of the flap valve 32 may be provided with a fluid seal. Although this increases restriction, the lack of any such fluid seal could give rise to "silting" of braking fluid deposits which results in worse restriction. Preferably, the seal is a resilient one which flexes with movement of the flap valve 32, rather than being a seal on the piston 41 which moves with the flap valve 32 relative to the bore wall, or vice-versa.

What we claim is:

1. A fluid pressure control device comprising:
   a fluid flow control assembly having a fluid path extending between inlet and outlet ports, said assembly including a flow control orifice, for producing a pressure differential between said inlet and outlet ports of said assembly:
   a displaceable flow-measuring piston across which a fluid pressure difference can be established due to the restriction by said flow control orifice to flow of fluid in said path, a seat disposed in said fluid path for cooperation with said flow measuring piston, said fluid pressure difference providing a force tending to displace said flow-measuring piston into sealing engagement with said seal to limit fluid flow out of said outlet port;
   an elongated axial first passageway having an orifice disposed therein, said passageway extending axially through said flow-measuring piston;
   a sealing and balancing member disposed at the side of the flow-measuring piston remote from said outlet port having a surface configured for sealing engagement about one end of said elongated axial first passageway which is in fluid communication with said outlet port, a second passageway disposed in said sealing and balancing member in fluid communication with said orifice and within the seal boundary to provide a fluid pressure equalizing part for applying fluid pressure at said outlet port to an equalizing area of said sealing and balancing member about said aperture, which equalizing area is isolated from fluid pressure at said inlet port;
   a solenoid valve mechanism disposed in said fluid flow path, said mechanism having a relief port;
   an armature of said mechanism, said armature being responsive to an electric potential to cause said valve mechanism to open said relief port, said mechanism including biasing means urging said valve mechanism toward a closed position;
   said mechanism further including a flow-measuring member which is displaceable against the force of said biasing means by a force produced by a fluid pressure difference across said flow-measuring member due to a flow of fluid into said relief port, to displace said armature against said solenoid force so as to tend to cause said valve to close said relief port, the flow rate into said relief port being thereby held at a substantially constant value at which the force produced by said fluid pressure difference is substantially equal to said solenoid force; and
   means for mechanically engaging said flow-measuring member with said sealing and balancing member so that said biasing means acts effectively when said solenoid is unenergized to urge said flow-measuring piston away from said cooperating seat in opposition to the force due to the fluid pressure difference across said flow-measuring piston, whereby the flow rate of fluid into said outlet port is a function of the force of said biasing means and the cross-sectional area of said flow control orifice, until the difference between the fluid pressures at said inlet and said outlet ports is sufficiently low for the biasing means, acting through said means for mechanically engaging said flow-measuring member, to separate said sealing and balancing member from said flow-measuring piston, whereafter to permit flow of fluid between said inlet and outlet ports via said orifice through the flow-measuring piston.

2. A device as claimed in claim 1, wherein said armature comprises two parts one of which constitutes said flow-measuring member.

3. A device as claimed in claim 2, wherein said means mechanically engaging said flow-measuring member with said sealing and balancing member is an elongated member which is integral with said sealing and balancing member.

4. A device as claimed in claim 3, wherein the balancing portion of said sealing and balancing member is a piston provided with a fluid seal which flexes with movement of said member.

5. An anti-lock vehicle brake system having a fluid pressure control device as claimed in claim 4, a fluid pressure source connected to said inlet port, a wheel brake connected to said outlet port, and further comprising means for varying the biasing means effective force acting on said flow-measuring member as a function of the volume of fluid displaced into said relief connection through said relief port when said solenoid valve mechanism is energised.

* * * * *

UNITED STATES PATENT AND TRADEMARK OFFICE
CERTIFICATE OF CORRECTION

PATENT NO. : 3,893,693
DATED : July 8, 1975
INVENTOR(S) : DEREK ROBERT SKOYLES

It is certified that error appears in the above-identified patent and that said Letters Patent are hereby corrected as shown below:

<u>IN THE TITLE PAGE</u>

Section [30] above "Aug. 29, 1973, United Kingdom   43227/73"

it should read --Sept. 18, 1972, United Kingdom   43227/72--.

Signed and Sealed this

Tenth Day of August 1976

[SEAL]

Attest:

RUTH C. MASON
*Attesting Officer*

C. MARSHALL DANN
*Commissioner of Patents and Trademarks*